(12) United States Patent
Aono et al.

(10) Patent No.: US 9,300,870 B2
(45) Date of Patent: Mar. 29, 2016

(54) IMAGING APPARATUS WITH TIME PERIODS FOR CHARGING A DRIVING MECHANISM THAT DRIVES A MECHANICAL SHUTTER

(71) Applicant: Panasonic Intellectual Property Management Co., Ltd., Osaka (JP)

(72) Inventors: Hiroki Aono, Osaka (JP); Gaku Suzuki, Osaka (JP); Yasuhiro Nakagai, Osaka (JP)

(73) Assignee: Panasonic Intellectual Property Management Co., LTD., Osaka (JP)

( * ) Notice: Subject to any disclaimer, the term of this patent is extended or adjusted under 35 U.S.C. 154(b) by 0 days.

(21) Appl. No.: 14/624,755

(22) Filed: Feb. 18, 2015

(65) Prior Publication Data
US 2015/0256751 A1     Sep. 10, 2015

(30) Foreign Application Priority Data

Mar. 5, 2014 (JP) ................................ 2014-042323
Jan. 26, 2015 (JP) ................................ 2015-011963

(51) Int. Cl.
*H04N 5/225* (2006.01)
*H04N 5/232* (2006.01)
*H04N 5/235* (2006.01)

(52) U.S. Cl.
CPC ......... *H04N 5/23245* (2013.01); *H04N 5/2353* (2013.01)

(58) Field of Classification Search
CPC ............ H04N 5/23245; H04N 5/2353; H04N 5/2254; H04N 5/3532
See application file for complete search history.

(56) References Cited

U.S. PATENT DOCUMENTS

| | | | | |
|---|---|---|---|---|
| 8,147,152 B2* | 4/2012 | Nakagawa | ............. | G03B 17/38 348/363 |
| 8,646,993 B2* | 2/2014 | Kosaka | .................. | G03B 19/12 396/357 |
| 8,654,245 B2* | 2/2014 | Takahata | ............. | H04N 5/2254 348/362 |
| 2010/0321556 A1* | 12/2010 | Misawa | ................... | G03B 9/02 348/341 |
| 2011/0052184 A1* | 3/2011 | Nakagawa | ............. | G03B 17/38 396/502 |
| 2012/0249860 A1* | 10/2012 | Nakai | ...................... | G03B 9/64 348/362 |
| 2012/0249861 A1* | 10/2012 | Takahata | ............. | H04N 5/2254 348/362 |

FOREIGN PATENT DOCUMENTS

| | | |
|---|---|---|
| JP | 2011-053375 | 3/2011 |
| JP | 2011-164331 | 8/2011 |
| JP | 2012-215798 | 11/2012 |

* cited by examiner

*Primary Examiner* — Nicholas Giles
(74) *Attorney, Agent, or Firm* — Wenderoth, Lind & Ponack, L.L.P.

(57) ABSTRACT

The imaging apparatus has a single shooting mode and a continuous shooting mode, and includes: an imaging element configured to generate image data; a mechanical shutter configured to control exposure of the imaging element; a charge block including a driving mechanism configured to drive the mechanical shutter and a motor configured to provide a driving force for the driving mechanism, and a control section configured to control the charge block. The control section performs a charging operation for charging the driving mechanism by causing the motor to rotate in a capturing operation, performs the charging operation in a first time period in a case where the imaging apparatus is in the continuous shooting mode, and performs the charging operation in a second time period which is longer than the first time period in a case where the imaging apparatus is in the single shooting mode.

6 Claims, 8 Drawing Sheets

IMAGING APPARATUS WITH TIME PERIODS FOR CHARGING A DRIVING MECHANISM THAT DRIVES A MECHANICAL SHUTTER

TECHNICAL FIELD

The present disclosure relates to a shutter drive of an imaging apparatus that is capable of performing continuous shooting.

DESCRIPTION OF THE RELATED ART

PTL 1 discloses a technology of enabling a digital camera to shorten intervals between shooting processes in the case where the digital camera performs continuous shooting to obtain a plurality of still images.

CITATION LIST

Patent Literature

PTL 1: Unexamined Japanese Patent Publication No. 2011-164331

SUMMARY

The present disclosure provides an imaging apparatus that enables high speed continuous shooting during continuous shooting and enables reduction of noise caused by capturing during single shooting.

The imaging apparatus according to the present disclosure is an imaging apparatus having a single shooting mode and a continuous shooting mode, including: an imaging element configured to generate image data; a mechanical shutter configured to control exposure of the imaging element; a charge block including a driving mechanism configured to drive the mechanical shutter and a motor configured to provide a driving force for the driving mechanism, and a control section configured to control the charge block. The control section performs a charging operation for charging the driving mechanism by causing the motor to rotate in a capturing operation, performs the charging operation in a first time period in a case where the imaging apparatus is in the continuous shooting mode, and performs the charging operation in a second time period which is longer than the first time period in a case where the imaging apparatus is in the single shooting mode.

The present disclosure can provide the imaging apparatus that speeds up a frame speed during the continuous shooting and reduces the noise caused by the capturing during the single shooting.

DETAILED DESCRIPTION OF THE PREFERRED EMBODIMENTS

Exemplary embodiments will be described in detail below with reference to the drawings as required. However, an excessively detailed description may be omitted. For example, a detailed description of an already well-known matter and a repetitive description of substantially the same configuration may be omitted. Such omissions are for avoiding unnecessary redundancy in the following description to facilitate understanding by those skilled in the art.

The inventors provide the accompanying drawings and the following description for those skilled in the art to fully understand the present disclosure and do not intend to limit the subject described in the claims by the accompanying drawings and the following description.

First Exemplary Embodiment

The first exemplary embodiment will be described below with reference to FIG. 1 to FIG. 7.

1. Configuration 1-1. Configuration of the Digital Camera

Figure 1:
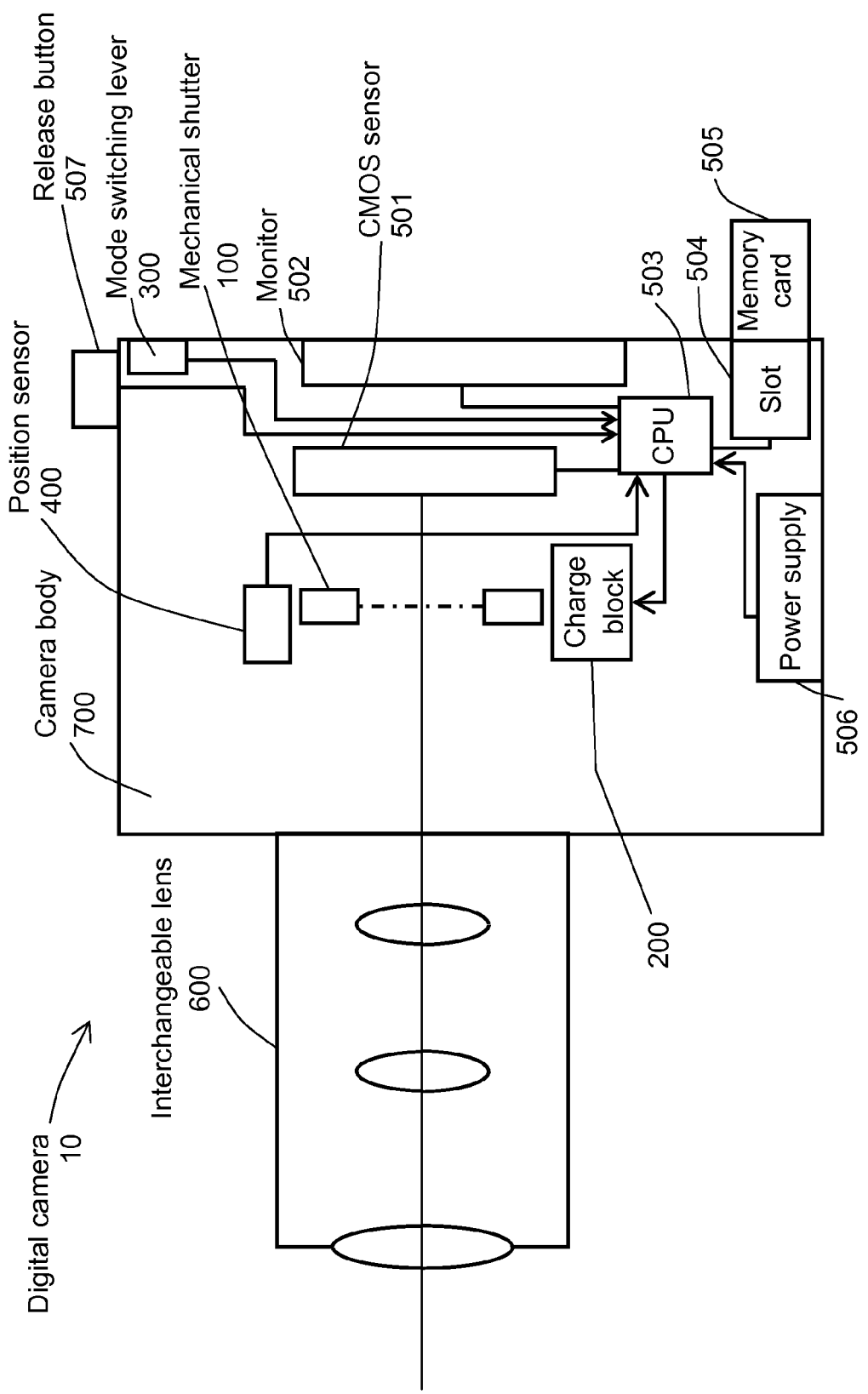
FIG. 1 is an electrical block diagram of a digital camera according to a first exemplary embodiment.

FIG. 1 is a diagram illustrating an essential part of an electrical configuration of digital camera 10 according to the first exemplary embodiment. Digital camera 10 includes interchangeable lens 600 and camera body 700. Camera body 700 includes mechanical shutter 100, charge block 200, mode switching lever 300, position sensor 400, CMOS sensor 501, monitor 502, CPU 503, slot 504 for memory card 505, power supply 506, and release button 507. Digital camera 10 is an example of the imaging apparatus.

Interchangeable lens 600 is a lens that detachably fixed to camera body 700. Interchangeable lens 600 has an optical system including a zoom lens, a focus lens, a shake correction lens, and an aperture. Interchangeable lens 600 has a driver configured to drive the optical system.

Mode switching lever 300 is a switching type operation member. A user can switch a shooting mode between a continuous shooting mode and a single shooting mode by operating mode switching lever 300. Incidentally, the continuous shooting mode may be set with levels in accordance with continuous shooting speed. In other words, digital camera 10 may provide options such as a high speed continuous shooting mode and a low speed continuous shooting mode. Meanwhile, digital camera 10 may receive an instruction for switching the mode between the single shooting mode and the continuous shooting mode from an operation member different from mode switching lever 300. Incidentally, in the first exemplary embodiment, it is assumed that the high speed continuous shooting mode is used as the continuous shooting mode.

Figure 2A:
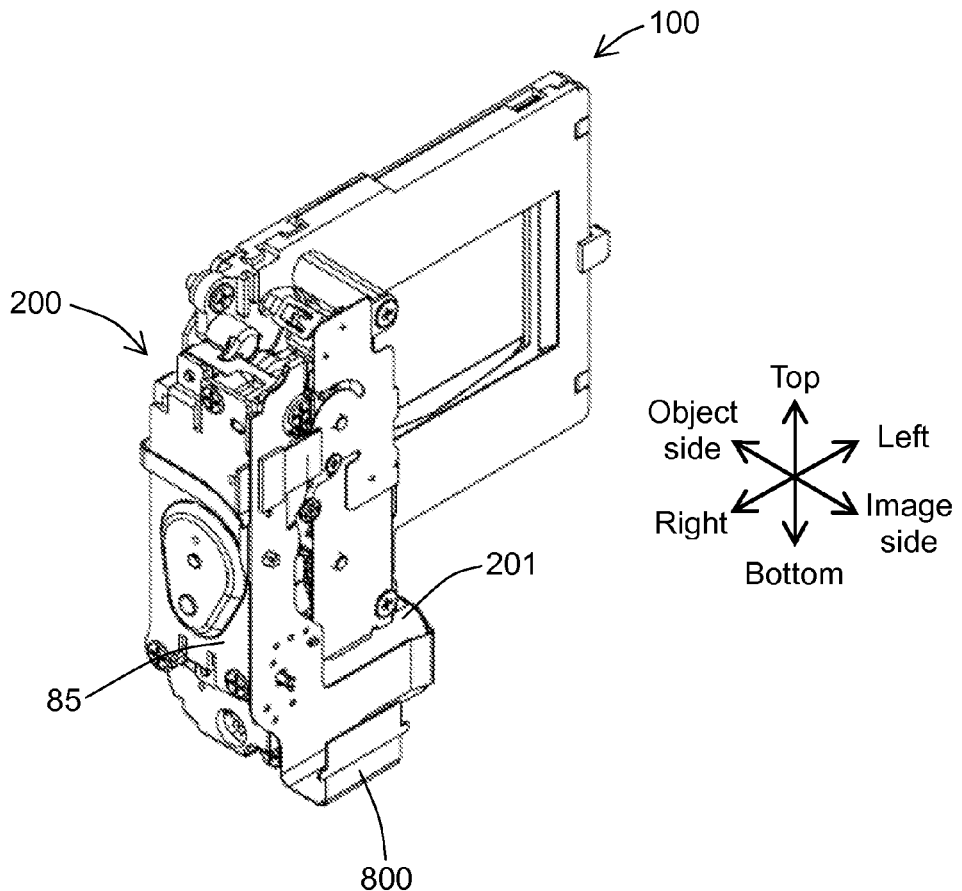
FIG. 2A is a schematic diagram of a mechanical shutter and a charge block according to the first exemplary embodiment.
Figure 2B:
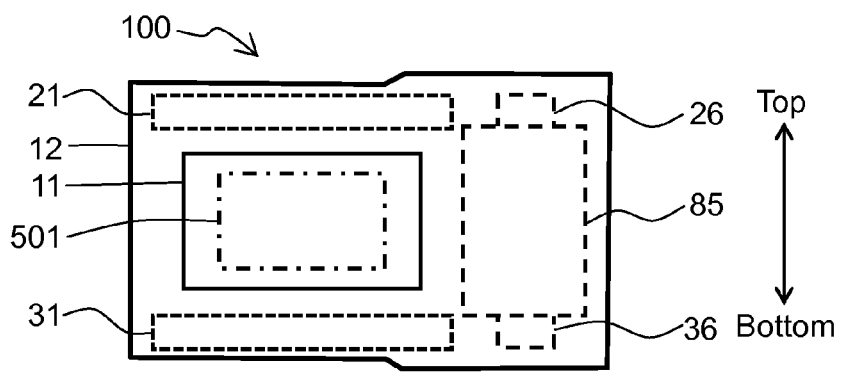
FIG. 2B is a schematic diagram of the mechanical shutter and the charge block according to the first exemplary embodiment viewed from a subject side.

Position sensor 400 is disposed at a position where position sensor 400 can detect that front curtain 31 and rear curtain 21 of mechanical shutter 100 illustrated in FIG. 2B have moved to a predetermined position. In the first exemplary embodiment, position sensor 400 is disposed so that position sensor 400 detects that front curtain 31 and rear curtain 21 have moved away from opening 11 to be described later illustrated in FIG. 2B. Position sensor 400 can be implemented by a photo interrupter or the like.

CMOS sensor 501 is an example of the imaging element. CMOS sensor 501 generates image data by performing photoelectric conversion on a subject optical image formed by interchangeable lens 600. CMOS sensor 501 can obtain still image data and moving image data. The obtained moving image data is also used for displaying a through image. Incidentally, the through image refers to real-time image data generated by CMOS sensor 501.

Monitor 502 displays image data. The image data includes the image data obtained from CMOS sensor 501 and image data stored in memory card 505. In the case where digital camera 10 is in a shooting mode, monitor 502 can display the through image as the image data until release button 507 is pushed. Further, monitor 502 also can display capturing conditions of digital camera 10, operation menu, and so on together with the image data. Monitor 502 can be implemented by a liquid crystal display or the like.

CPU 503 is an example of the control section. CPU 503 performs overall control on digital camera 10. CPU 503 includes a power supply control section (not illustrated) which supplies electric power from power supply 506 to respective structural elements. The power supply control section can supply electric power to the respective structural elements by performing predetermined control on the power supply. CPU 503 may be made of a hardwired electronic circuit or may be made of a microcomputer or the like.

Slot 504 allows memory card 505 to be attached to it. Slot 504 controls memory card 505 based on a control signal sent from CPU 503. Specifically, slot 504 can store the image data in memory card 505. Further, slot 504 can output the image data from memory card 505.

Power supply 506 supplies electric power required for an overall operation of digital camera 10. The electric power supplied from power supply 506 is sent to the power supply control section and supplied from the power supply control section to the respective structural elements. Power supply 506 may be a dry battery or a rechargeable battery, for example. Alternatively, power supply 506 may supply digital camera 10 with electric power supplied from outside through a power cord.

Release button 507 is a two-stage operation button. In response to a user's half-push operation on release button 507, CPU 503 performs a focusing process at a predetermined position on an image. In response to a user's full-push operation on release button 507, CPU 503 drives mechanical shutter 100 to control exposure of CMOS sensor 501. Then, CPU 503 stores the image data in memory card 505. In the case where digital camera 10 is set to the continuous shooting mode, CPU 503 continues recording the image data at predetermined time intervals during the user's full-push operation on release button 507.

1-2. Configuration of the Mechanical Shutter

FIG. 2A is a schematic diagram of mechanical shutter 100 and charge block 200. FIG. 2B is a schematic diagram of mechanical shutter 100 and charge block 200 viewed from a subject side.

Mechanical shutter 100 is a generally used focal-plane shutter provided with front curtain 31 and rear curtain 21. Mechanical shutter 100 is provided with elements such as base member 12 having opening 11, front curtain 31, and rear curtain 21. Charge block 200 has front curtain electromagnet 36, rear curtain electromagnet 26, shutter driving mechanism 85, charge motor 201, and flexible cable 800.

Base member 12 has two plate members facing each other. First curtain 31 and rear curtain 21 are disposed so as to travel between the plate members.

Opening 11 is a hole for light coming through and is provided in mechanical shutter 100. When mechanical shutter 100 is viewed from the subject side, CMOS sensor 501 is disposed in front of opening 11. CMOS sensor 501 detects the light that has passed through opening 11.

Rear curtain 21 is made of a plurality of plate members. Rear curtain 21 is disposed in mechanical shutter 100 to be able to move in a vertical direction. Rear curtain 21 is supported by shutter driving mechanism 85 to be able to move in the vertical direction. When rear curtain 21 covers opening 11, the plurality of plate members of rear curtain 21 are opened. When rear curtain 21 moves away from opening 11, the plurality of plate members of rear curtain 21 are closed in a folded state.

First curtain 31 is made of a plurality of plate members. First curtain 31 is disposed in mechanical shutter 100 to be able to move in a vertical direction. First curtain 31 is supported by shutter driving mechanism 85 to be able to move in the vertical direction. When front curtain 31 covers opening 11, the plurality of plate members of front curtain 31 are opened. When front curtain 31 moves away from opening 11, the plurality of plate members of front curtain 31 are closed in a folded state.

Rear curtain electromagnet 26 is an electromagnet. Rear curtain electromagnet 26 is controlled to be in a power available state or in a power unavailable state. Rear curtain electromagnet 26 is in the power available state when rear curtain electromagnet 26 attracts and holds an end of rear curtain 21. When rear curtain electromagnet 26 is in the power unavailable state, the end of rear curtain 21 is not attracted by rear curtain electromagnet 26. Rear curtain electromagnet 26 controls the holding state of rear curtain 21 by switching the state between the power available state and the power unavailable state. Rear curtain electromagnet 26 attracts and holds rear curtain 21 in a charged state which is to be described later.

Front curtain electromagnet 36 is an electromagnet. Front curtain electromagnet 36 is controlled to be in a power available state or in a power unavailable state. Front curtain electromagnet 36 is in the power available state when front curtain electromagnet 36 attracts and holds an end of front curtain 31. When front curtain electromagnet 36 is in the power unavailable state, the end of front curtain 31 is not attracted by front curtain electromagnet 36. Front curtain electromagnet 36 controls the holding state of front curtain 31 by switching the state between the power available state and the power unavailable state. Front curtain electromagnet 36 attracts and holds front curtain 31 in a charged state which is to be described later.

Shutter driving mechanism 85 movably supports rear curtain 21 and front curtain 31 against mechanical shutter 100. Shutter driving mechanism 85 has a front curtain travelling spring, a front curtain setting spring, a rear curtain travelling spring, a rear curtain setting spring, a driving lever, and a drive gear which are not illustrated in the drawings. The rear curtain travelling spring applies an elastic force for travelling rear curtain 21 in a downward direction to rear curtain 21. The rear curtain setting spring applies an elastic force for travelling rear curtain 21 in an upward direction to rear curtain 21. Since the elastic force of the rear curtain travelling spring is stronger than the elastic force of the rear curtain setting spring, rear curtain 21 can travel in the downward direction against the elastic force of the rear curtain setting spring. The front curtain travelling spring applies an urging force for travelling front curtain 31 in a downward direction to front curtain 31. The front curtain setting spring applies an elastic force for travelling front curtain 31 in an upward direction to front curtain 31.

The driving lever is rotatably supported against charge block 200. When the driving lever has been driven, the front curtain travelling spring and the rear curtain travelling spring are compressed and the elastic forces for travelling rear curtain 21 and front curtain 31 are charged. The above described charging operation is activated as a result of winding up of charge motor 201 and driving of the drive gear. Incidentally, a state of front curtain 31 or rear curtain 21 having been charged will be referred to as the charged state.

Charge motor 201 is an example of the motor. Charge motor 201 provides a driving force for shutter driving mechanism 85. A gear (not illustrated) attached to charge motor 201 is meshed with a driving gear (not illustrated) in shutter driving mechanism 85. As a result of winding up of charge motor 201, the charging operation of shutter driving mechanism 85 is activated. Charge motor 201 can be implemented by a direct-current motor, for example. Charge motor 201 is controlled by CPU 503.

Flexible cable 800 has a circuit pattern laid out on it. Flexible cable 800 is connected with CPU 503, a position sensor 400, and so on. Flexible cable 800 can be implemented by a flexible print circuit (FPC) or the like which has great flexibility.

2. Operation 2-1. Mechanical Shutter Driving During Capturing Operation

Operation of mechanical shutter 100 performed by digital camera 10 which performs a capturing operation will be described with reference to FIG. 3A to FIG. 3D. In the case where digital camera 10 is in a shooting mode, both of rear curtain 21 and front curtain 31 are kept away from opening 11 until digital camera 10 receives a user's full-push operation on release button 507. In that case, mechanical shutter 100 is in the state illustrated in FIG. 3A in which the light which has come through opening 11 is detected by CMOS sensor 501 and image data is generated. The image data generated by CMOS sensor 501 is displayed on monitor 502 as a through image.

Figure 3A:
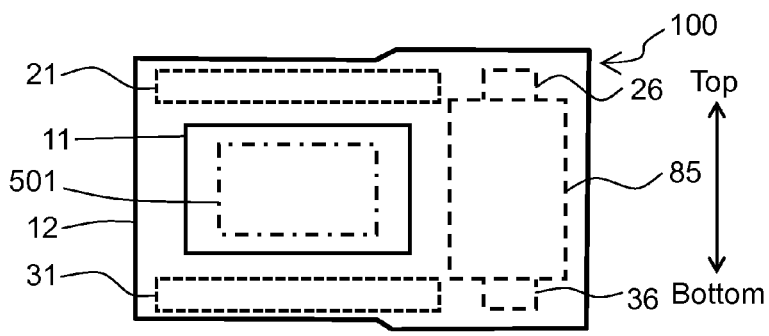
FIG. 3A to FIG. 3D are diagrams illustrating driving of the mechanical shutter according to the first exemplary embodiment.
Figure 3B:
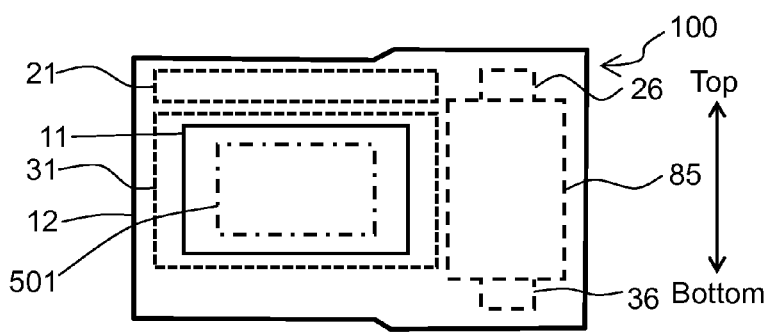
Figure 3C:
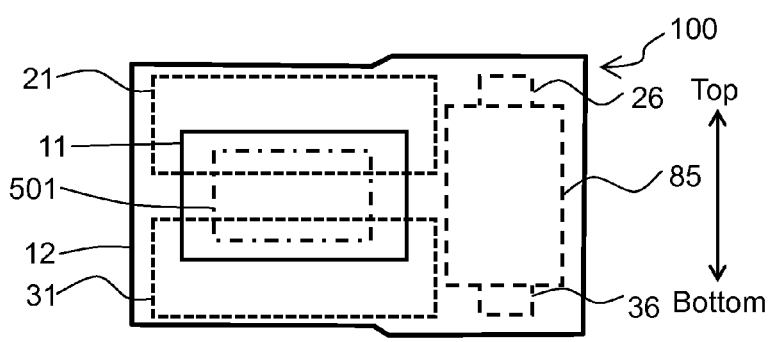

In response to the user's full-push operation on release button 507, front curtain 31 is driven so that it cover opening 11 as illustrated in FIG. 3B. As a result, the light does not reach CMOS sensor 501. After a mechanical operation of front curtain 31 for covering opening 11 has stabilized, front curtain 31 and rear curtain 21 start traveling. In that case, rear curtain 21 travels to follow front curtain 31 with a space from front curtain 31 as illustrated in FIG. 3C. CMOS sensor 501 captures a subject image through the space between front curtain 31 and rear curtain 21. Incidentally, in the case where an exposure time is set longer than a predetermined time period, rear curtain 21 starts traveling after the predetermined time period from the end of traveling of front curtain 31.

Figure 3D:
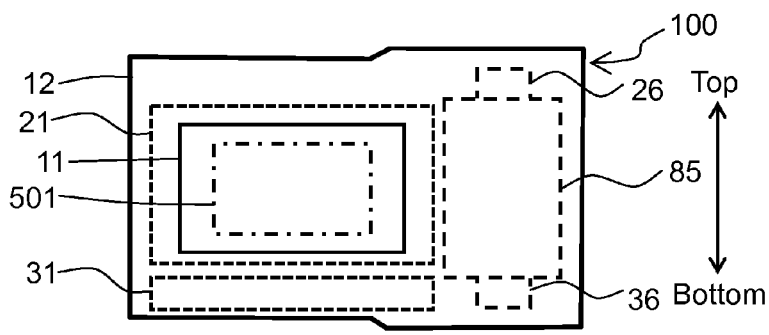

When the traveling operation has finished, rear curtain 21 is kept covering opening 11 as illustrated in FIG. 3D. As a result, the light does not reach CMOS sensor 501. Then, CPU 503 reads out the image data from CMOS sensor 501. When the image data has been read out, digital camera 10 becomes to capture an image again. In the case where digital camera 10 is set to the continuous shooting mode, the above described operation is repeated during the user's full-push operation on release button 507.

2-2. Switching of the Shooting Mode

Figure 4:
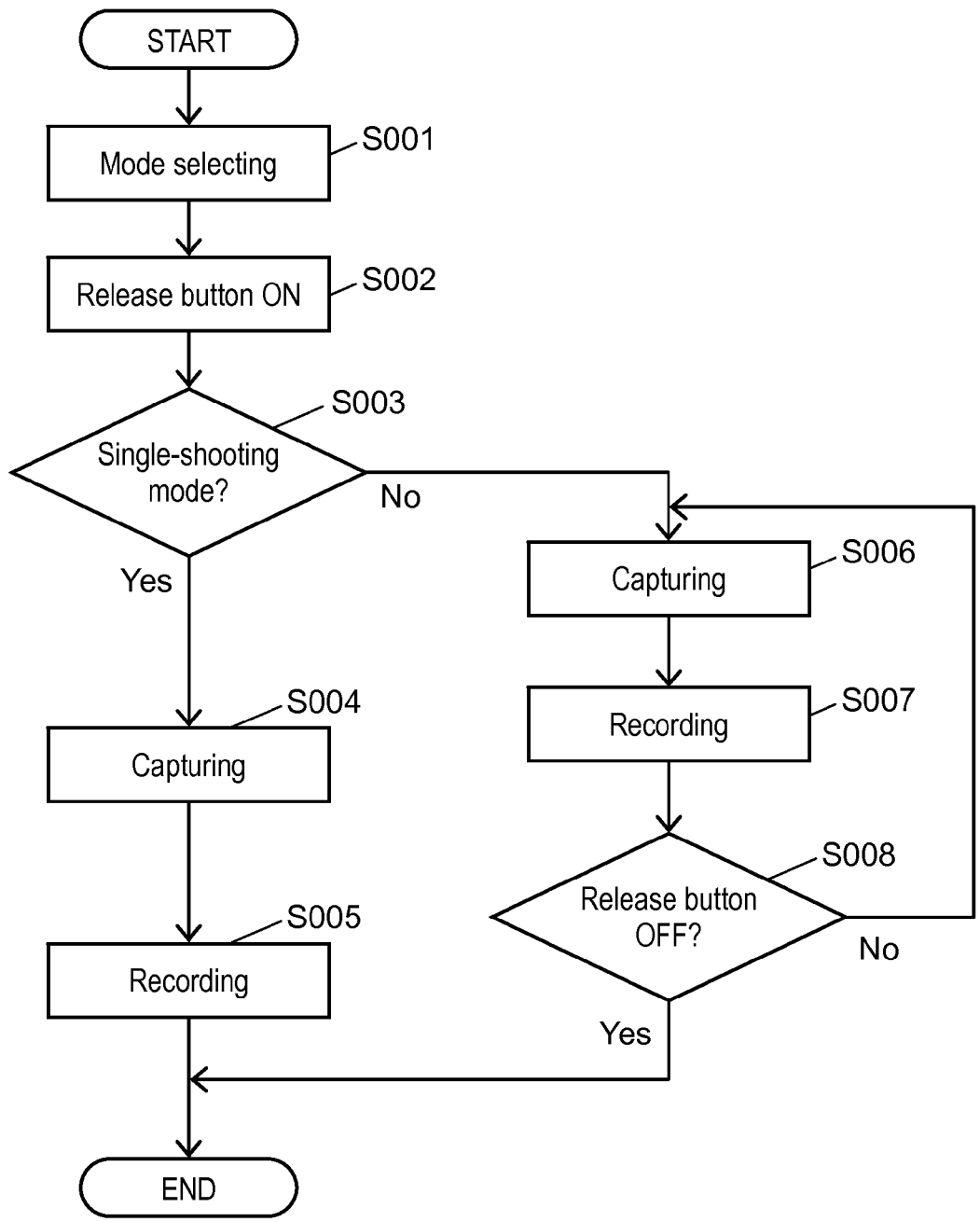
FIG. 4 is a flow chart showing switching of shooting mode of the digital camera according to the first embodiment.

FIG. 4 is a flow chart outlining the switching of the shooting mode of digital camera 10.

The user can switch the shooting mode between the single shooting mode and the continuous shooting mode by operating mode switching lever 300 in step S001. In the case where digital camera 10 is in a shooting mode, the user decides the angle of view and the like of an image to capture by viewing the through image displayed on monitor 502 and performs the full-push operation on release button 507, i.e., switches ON release button 507, in step S002. In response to the full-push operation on release button 507, digital camera 10 determines the shooting mode. Specifically, digital camera 10 determines whether digital camera 10 is set to the single shooting mode or the continuous shooting mode in step S003.

In the case where digital camera 10 is set to the single shooting mode, i.e., digital camera 10 has determined Yes in step S003, digital camera 10 captures the subject image in step S004. In step S004, digital camera 10 drives front curtain 31, rear curtain 21, front curtain electromagnet 36, rear curtain electromagnet 26, and charge motor 201 in accordance with a time chart to be described later. Further, CPU 503 reads out the image data generated by CMOS sensor 501. When the image data has been read, CPU 503 records the image data in memory card 505 in step S005. When the recording of the image data has finished, monitor 502 displays the through image again. Then, digital camera 10 waits for next capturing.

In the case where digital camera 10 is set to the continuous shooting mode, i.e., digital camera 10 has determined No in step S003, digital camera 10 continuously performs the capturing operation during the full-push operation on release button 507. When digital camera 10 receives the full-push operation on release button 507, digital camera 10 first captures an image of a first frame in step S006 and records the first frame in step S007. Since the capturing operation and the recording operation are the same as those in the single shooting mode, description of these operations will be omitted. When the recording has finished, digital camera 10 checks whether the full-push operation on release button 507 has been finished or not in step S008. In the case where the full-push operation on release button 507 has not been finished, i.e., digital camera 10 has determined No in step S008, digital camera 10 proceeds to the capturing operation of the next frame. On the other hand, in the case where the full-push operation on release button 507 has been finished, i.e., digital camera 10 has determined Yes in step S008, digital camera 10 finishes the continuous shooting. When the continuous shooting has finished, monitor 502 displays the through image again. Then, digital camera 10 waits for next capturing.

Incidentally, although it is assumed that digital camera 10 records the image data in memory card 505 in the recording operation, the present disclosure is not limited to that. Digital camera 10 may temporarily save the image data in an internal memory or a buffer.

Digital camera 10 according to the first exemplary embodiment changes operational timing for mechanical shutter 100 and charge block 200 between the capturing in the single shooting mode in step S004 and the capturing in the continuous shooting mode in step S006. The operations of digital camera 10 in the single shooting mode and the continuous shooting mode will be described below.

2-3. Continuous Shooting Operation

Figure 5:
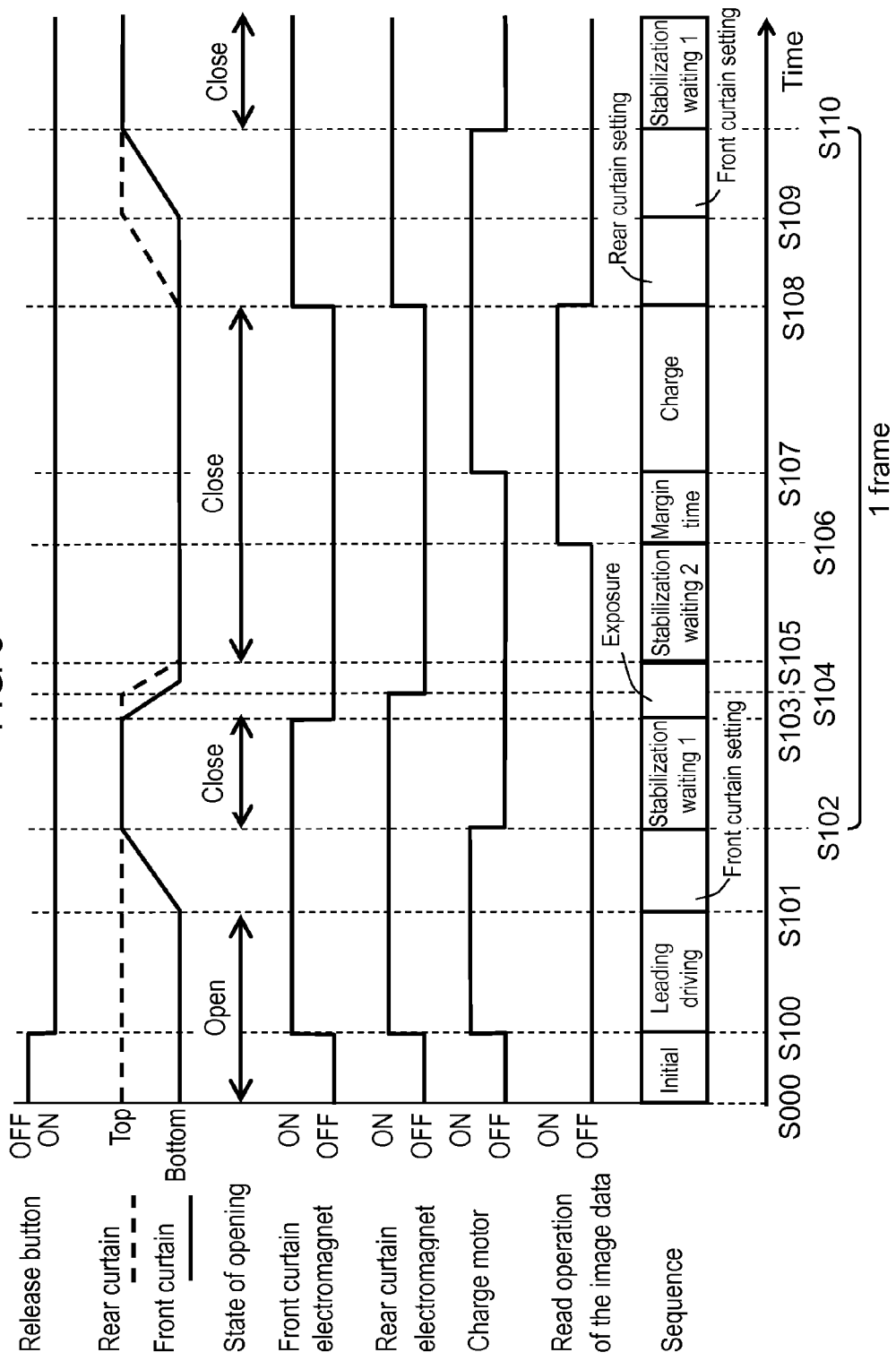
FIG. 5 is a time chart of continuous shooting performed by the digital camera according to the first exemplary embodiment.

FIG. 5 is a time chart of the continuous shooting performed by digital camera 10 using mechanical shutter 100. Digital camera 10 set to the continuous shooting mode waits for the user's full-push operation on release button 507, i.e., the switching ON of release button 507, with front curtain 31 and rear curtain 21 moved away from opening 11. In that state, digital camera 10 displays a through image obtained from CMOS sensor 501 on monitor 502 at time S000.

In response to the user's full-push operation on release button 507, front curtain electromagnet 36 and rear curtain electromagnet 26 enter the power available state, i.e., are switched ON, at time S100. Further, charge motor 201 also enters the power available state, i.e., is also switched ON, at time S100.

When charge motor 201 has entered the power available state, charge motor 201 starts charging shutter driving mechanism 85, which is referred to as leading driving. When shutter driving mechanism 85 has been charged at time S101, shutter driving mechanism 85 drives front curtain 31 to set it in the state illustrated in FIG. 3B, which is referred to as front curtain setting.

When front curtain 31 has been set at time S102, charge motor 201 performs short break (SB). Since shutter driving mechanism 85 which includes the spring drives front curtain 31 to set front curtain 31, front curtain 31 is still in microscopic vibration even after it has been set. Since the microscopic vibration may affect the next operation, digital camera 10 waits for a predetermined time period until front curtain 31 is stabilized after digital camera 10 has set front curtain 31, which is referred to as stabilization waiting 1. The predetermined time period here is a time period enough for the microscopic vibration of front curtain 31 to be attenuated which has been previously decided for digital camera 10.

When front curtain 31 has been stabilized, CPU 503 de-energizes front curtain electromagnet 36, i.e., switches OFF front curtain electromagnet 36, at time S103. When front curtain electromagnet 36 has been de-energized, front curtain 31 is free from the attracting and holding state and moved away from opening 11 by shutter driving mechanism 85.

After a predetermined time period, i.e., a shutter speed, has passed, CPU 503 de-energizes rear curtain electromagnet 26, i.e., switches OFF rear curtain electromagnet 26, at time S104. When rear curtain electromagnet 26 has been de-energized, rear curtain 21 is free from the attracting and holding state and driven by shutter driving mechanism 85 to block opening 11 at time S105.

During a time period from time S103 to time S105 inclusive, part of opening 11 is not covered by front curtain 31 and rear curtain 21 as illustrated in FIG. 3C, which is referred to as exposure. CMOS sensor 501 takes light from the part of opening 11 that is not covered by front curtain 31 and rear curtain 21. In the first exemplary embodiment, a time period from time S103 to time S105 inclusive will be referred to as an exposure time. The exposure time refers to a time period from a start of traveling of front curtain 31 until an end of traveling of rear curtain 21. The exposure time is decided from the shutter speed which is decided from settings made by the user and the like and traveling speeds of front curtain 31 and rear curtain 21. Incidentally, the shutter speed usually refers to a time period from the start of traveling of front curtain 31 until the start of traveling of rear curtain 21, i.e., from time S103 to time S104.

When front curtain 31 has moved away from opening 11 and rear curtain 21 has completely blocked opening 11 at time S105, opening 11 is blocked by rear curtain 21 as illustrated in FIG. 3D. In that state, the light which would come into CMOS sensor 501 is blocked by rear curtain 21.

In exposure operation from time S103 to time S105 inclusive, both of front curtain 31 and rear curtain 21 are driven by shutter driving mechanism 85 which includes the spring. As a result, front curtain 31 and rear curtain 21 are still in microscopic vibration even after the exposure operation has finished. Since the microscopic vibration may affect subsequent operation, digital camera 10 waits for a predetermined time period until front curtain 31 and rear curtain 21 are stabilized, which is referred to as stabilization waiting 2. The predetermined time period here is a time period enough for front curtain 31 and rear curtain 21 to be stabilized which has been previously decided by digital camera 10.

When front curtain 31 and rear curtain 21 have been stabilized, CPU 503 starts reading the image data from CMOS sensor 501 at time S106. After a predetermined time period which is a margin time has passed, in parallel with the reading of image data, shutter driving mechanism 85 is charged by charge motor 201 at time S107 in preparation for next frame capturing. The margin time from time S106 to time S107 inclusive will be described later. A time required for the charging here is decided from mechanical factors involved in the charging of shutter driving mechanism 85 performed by charge motor 201.

When shutter driving mechanism 85 has been charged, CPU 503 causes front curtain electromagnet 36 and rear curtain electromagnet 26 to be in the power available state, i.e., switches ON front curtain electromagnet 36 and rear curtain electromagnet 26. Further, shutter driving mechanism 85 moves rear curtain 21 away from opening 11 at time S108. When rear curtain 21 has been moved away from opening 11, rear curtain 21 is attracted and held by rear curtain electromagnet 26. Then, shutter driving mechanism 85 starts setting front curtain 31 to cover opening 11 at time S109. When front curtain 31 has been set at time S110, front curtain 31 is attracted and held by front curtain electromagnet 36. When rear curtain 21 and front curtain 31 have been set, digital camera 10 causes charge motor 201 to perform the short break and waits until rear curtain 21 and front curtain 31 are stabilized, which is referred to as stabilization waiting 1. That is, time S110 corresponds to time S102.

Now, the margin time from time S106 to time S107 inclusive will be described. As described above, a charging time is a time period decided from the mechanical factors. Further, the sequence of mechanical shutter 100 continues regardless of the image data reading. Specifically, when shutter driving mechanism 85 has been charged, mechanical shutter 100 starts setting rear curtain 21 whether the reading operation of the image data has been finished or not. In that state, on the condition that the charging has finished and rear curtain 21 has been set before the image data reading finishes, CMOS sensor 501 detects the light during the image data reading. Then, the image data being read may be disturbed.

The margin time is set for the purpose of avoiding that condition. Since the time required for the image data reading is decided depending on a format of the image data, CPU 503 decides the margin time so that the image data reading finishes within a total time period of the margin time and the charging time, i.e., a time period from time S106 to time S108 inclusive.

Digital camera 10 according to the first exemplary embodiment can realize the continuous shooting by repeating the operation from time S102 to time S110 inclusive during the user's full-push operation on release button 507.

Incidentally, in the case where digital camera 10 performs the capturing with use of the time chart of the continuous shooting illustrated in FIG. 5, a rotation speed of charge motor 201 is so fast that the driving gear in shutter driving mechanism 85 makes a loud noise of charging noise during the charging operation. For example, the loud noise is caused by a friction sound made by the gears, friction sounds made by the gears and shafts, and the like. As a result, digital camera 10 may make the user feel discomfort. Digital camera 10 has to make the rotation speed of charge motor 201 fast to secure a continuous shooting speed in the continuous shooting, but in the single shooting, digital camera 10 does not have to make the rotation speed of charge motor 201 faster than necessary. Then, digital camera 10 according to the first exemplary embodiment reduces production of noise by adjusting the time required for the charging in the single shooting. The capturing operation in the single shooting will be described in detail below.

2-4. Single Shooting Operation

Figure 6:
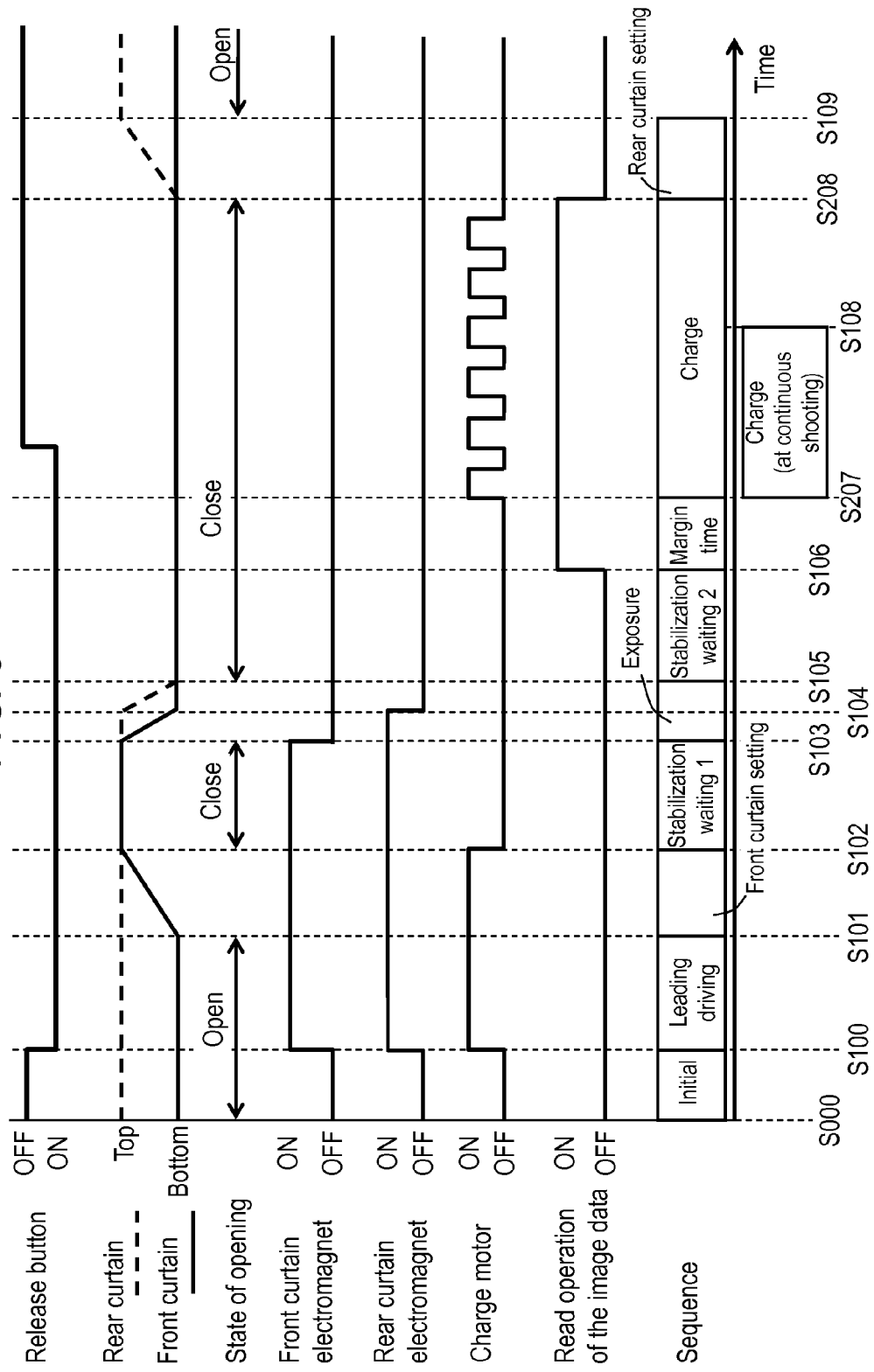
FIG. 6 is a time chart of single shooting performed by the digital camera according to the first exemplary embodiment.

FIG. 6 is a time chart of the single shooting performed by digital camera 10 using mechanical shutter 100. Since the period from time S000 to time S106 inclusive is the same as that in the time chart of the continuous shooting illustrated in FIG. 5, description of the period will be omitted.

When front curtain 31 and rear curtain 21 have been stabilized, CPU 503 starts reading the image data from CMOS sensor 501 at time S106. After a predetermined time period which is a margin time has passed, in parallel with the reading of image data, shutter driving mechanism 85 is charged by charge motor 201 at time S207 in preparation for next frame capturing. In that state, digital camera 10 can adjust the time required for the charging, i.e., from time S207 to time S208 inclusive, by performing PWM (Pulse Width modulation) drive on charge motor 201. The PWM drive will be described later. When the charging has finished, digital camera 10 sets rear curtain 21 and displays a through image on monitor 502 at time S109.

Incidentally, although the full-push operation on release button 507 is finished between time S207 and time S208 in FIG. 6, the full-push operation on release button 507 may be finished at any moment during the driving in the single shooting. This is because digital camera 10 only checks the moment of the full-push operation on release button 507 in the single shooting as illustrated in FIG. 4.

Figure 7:
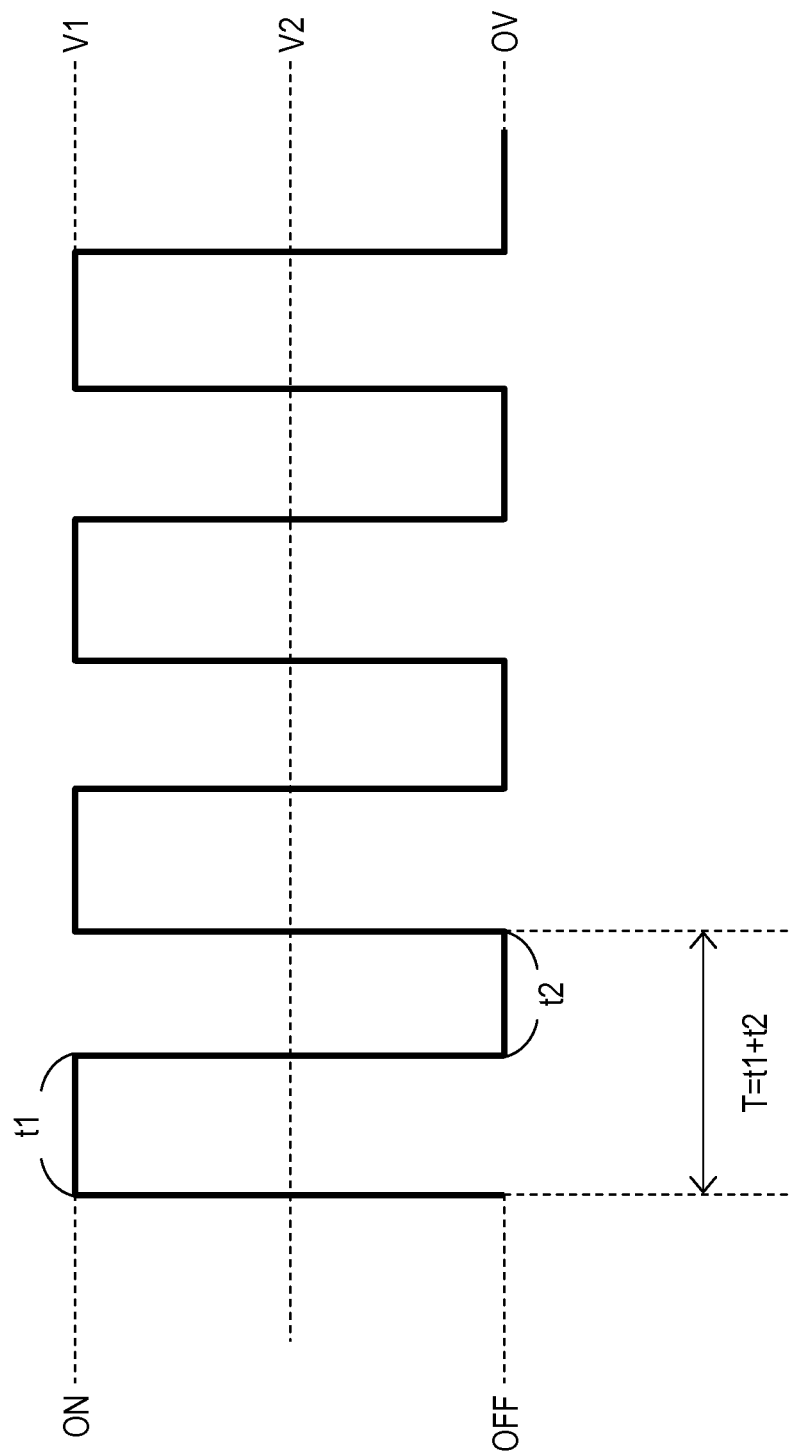
FIG. 7 is a schematic diagram of a PWM (Pulse Width Modulation) drive performed by the digital camera according to the first exemplary embodiment.

FIG. 7 is a diagram illustrating a voltage applied to charge motor 201 between time S207 to time S208 illustrated in FIG. 6. In the case where digital camera 10 is set to the single shooting mode, CPU 503 supplies electric power to charge motor 201 by using the PWM drive illustrated in FIG. 7 and performs the charging operation.

The PWM drive will be described. CPU 503 turns ON/OFF the voltage applied to charge motor 201. A voltage applied to charge motor 201 in the case where the applied voltage is always kept ON will be referred to as voltage V1. By using the PWM drive, digital camera 10 can obtain the same effect as that in the case where voltage V2 which is a voltage lower than voltage V1 is applied to charge motor 201. The rotation speed of charge motor 201 becomes slower in the case where voltage V2 is applied than in the case where voltage V1 is applied. As a result, the time required for the charging becomes longer in the case where voltage V2 is applied to charge motor 201 than in the case where voltage V1 is applied to charge motor 201.

Voltage V2 is decided from a time required for turning ON or OFF the voltage applied to charge motor 201. A time period during which the voltage applied to charge motor 201 is ON in a certain cycle T will be referred to as time t1. Further, the time period during which the voltage applied to charge motor 201 is OFF in the certain cycle T will be referred to as time t2. The cycle T for performing the PWM drive is expressed as t1+t2.

For changing voltage V2 without changing the predetermined cycle T, CPU 503 adjusts time t1 and time t2. For example, in the case where CPU 503 makes time t1 longer and time t2 shorter, voltage V2 approaches voltage V1. Conversely, in the case where CPU 503 makes time t1 shorter and time t2 longer, voltage V2 approaches 0V.

In the case where digital camera 10 is in the single shooting mode, CPU 503 supplies electric power to charge motor 201 by using the PWM drive with predetermined values set to time t1 and time t2. In that manner, CPU 503 controls charge motor 201 so that the rotation speed becomes slower. As a result, as illustrated in FIG. 6, the time required for the charging in the single shooting becomes longer than that in the case of the continuous shooting.

3. Effects and the Like

Digital camera 10 according to the first exemplary embodiment causes the charging time to be different in the case where it performs the single shooting and in the case where it performs the continuous shooting. When digital camera 10 performs the single shooting, it adjusts the voltage applied to charge motor 201 by using the PWM drive. As a result, in the case where digital camera 10 performs the single shooting, digital camera 10 can reduce the noise caused by the high-speed rotation of charge motor 201 by setting the rotation speed of charge motor 201 slower than that in the case where digital camera 10 performs the continuous shooting.

Incidentally, although digital camera 10 according to the first exemplary embodiment uses the PWM drive in adjusting the voltage applied to charge motor 201, the present disclosure is not limited to that. For example, digital camera 10 may include a transistor in a circuit for supplying electric power to charge motor 201 so that the transistor reduces the voltage.

Alternatively, digital camera 10 may realize the high-speed rotation of charge motor 201 by using the PWM drive to perform the continuous shooting and making time t1 illustrated in FIG. 7 longer and time t2 illustrated in FIG. 7 shorter to cause voltage V2 applied to charge motor 201 to approach voltage V1 as much as possible.

Second Exemplary Embodiment

The second exemplary embodiment will be described below with reference to FIG. 8. Incidentally, since the configuration of digital camera 10 according to the second exemplary embodiment is the same as that has already been described with reference to FIG. 1, FIG. 2A, FIG. 2B, and FIG. 3A to FIG. 3D, the description of the configuration will be omitted. Further, it is assumed that digital camera 10 according to the second exemplary embodiment performs the single shooting and the continuous shooting in accordance with the flow chart illustrated in FIG. 4. Still further, it is assumed that digital camera 10 according to the second exemplary embodiment performs the driving in accordance with the time chart illustrated in FIG. 5 in performing the continuous shooting.

On the condition that front curtain 31 and rear curtain 21 touch mechanical edges at the end of their traveling in the capturing operation, bounding sounds are produced. For example, when the traveling of front curtain 31 and rear curtain 21 has finished in the exposure operation, the bounding sounds are produced. Further, when charge block 200 performs the charging, a charging sound which is a sound of winding up of the gear is produced. When the bounding sounds are mixed with the charging sound, they would result in discomfort sounds.

Then, in the second exemplary embodiment, digital camera 10 prevents the bounding sounds from mixed with the charging sound by adjusting the margin time in performing the single shooting.

Figure 8:
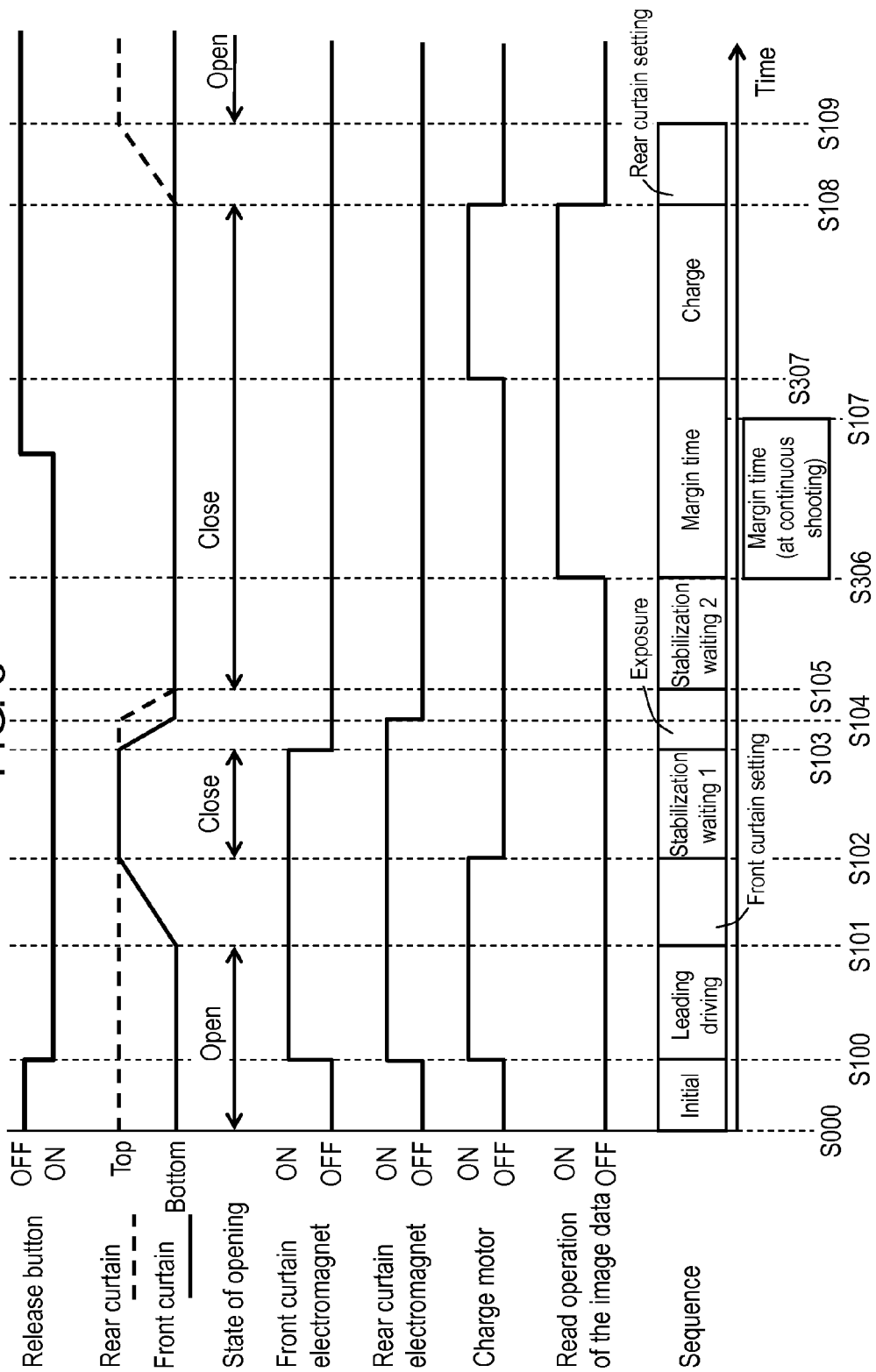
FIG. 8 is a time chart of the single shooting performed by a digital camera according to a second exemplary embodiment.

FIG. 8 is a time chart of the single shooting performed by digital camera 10 according to the second exemplary embodiment. Since the operation is the same as that described with reference to FIG. 5 except for the period from time S306 to time S307 inclusive, description of the operation will be omitted.

As described in the first exemplary embodiment, the sequence of digital camera 10 has the margin time for waiting for a predetermined time period set so that rear curtain 21 is not set during the reading operation of the image data. In the second exemplary embodiment, digital camera 10 sets the margin time longer in the single shooting than that in the continuous shooting from time S306 to time S307 inclusive as illustrated in FIG. 8. As a result, a time period from the exposure which produces the bounding sounds to the charging which produces the charging sound becomes longer, therefore, digital camera 10 can perform the single shooting without causing the bounding sounds and the charging sound to overlap each other.

Other Exemplary Embodiments

The first exemplary embodiment and the second exemplary embodiment have been described as examples of the technology disclosed in the present application. However, the technology in the present disclosure is not limited to these exemplary embodiments and may also be applied to exemplary embodiments which have been subjected to modification, substitution, addition, omission, or the like. Also, the respective constituent elements described in the first exemplary embodiment or the second exemplary embodiment may be combined to form a new embodiment.

Then, other exemplary embodiments will be described below as examples.

Although digital camera 10 moves front curtain 31 to a position under opening 11 and move rear curtain 21 to a position over opening 11 in the first exemplary embodiment and the second exemplary embodiment, the present disclosure is not limited to that. Digital camera 10 may move front curtain 31 to a position over opening 11 and move rear curtain 21 to a position under opening 11. Alternatively, digital camera 10 may be in a single curtain configuration of an electronic front curtain, a mechanical rear curtain, or the like.

In the first exemplary embodiment and the second exemplary embodiment, switching of the sequence in the continuous shooting and in the single shooting has been described. However, the present disclosure is not limited to that. A digital camera with a high speed continuous shooting mode, a low speed continuous shooting mode, and the like as a continuous shooting mode may switch the sequence between the high speed continuous shooting mode and the other shooting modes. Alternatively, the digital camera may switch the sequence in any continuous shooting and any single shooting.

Although it is assumed that digital camera 10 adjusts the margin time to prevent the bounding sounds from mixed with the charging sound in the second exemplary embodiment, the present disclosure is not limited to that. Digital camera 10 may prevent the bounding sounds from mixed with the charging sound by setting the time period of stabilization waiting 2 illustrated in FIG. 8 long to cause the time period from the exposure which produces the bounding sounds to the charging which produces the charging sound to be long. That is, although it is assumed that digital camera 10 causes the time period from the start of reading of the image data until the start of the charging operation, i.e., the margin time, in the time period from the end of the exposure until the start of the charging operation to be longer in the second exemplary embodiment, digital camera 10 may also causes the time period from the end of the exposure until the start of reading of the image data, i.e., the time period of stabilization waiting 2, to be longer.

INDUSTRIAL APPLICABILITY

The present disclosure is applicable to digital still cameras, movie cameras, camera-equipped mobile phones, smart phones, and the like.

What is claimed is:

1. An imaging apparatus having a single shooting mode and a continuous shooting mode, comprising:
    an imaging element configured to generate image data;
    a mechanical shutter configured to control exposure of the imaging element;
    a charge block comprising a driving mechanism configured to drive the mechanical shutter and a motor configured to provide a driving force for the driving mechanism; and
    a control section configured to control the charge block,
    wherein the control section
        performs a charging operation for charging the driving mechanism by causing the motor to rotate in a capturing operation,
        performs the charging operation in a first time period in a case where the imaging apparatus is in the continuous shooting mode, and
        performs the charging operation in a second time period which is longer than the first time period in a case where the imaging apparatus is in the single shooting mode.

2. The imaging apparatus according to claim 1, wherein the control section adjusts a time required for the charging operation by controlling a voltage applied to the motor.

3. The imaging apparatus according to claim 2, wherein the control section uses a PWM (Pulse Width Modulation) drive to apply the voltage to the motor in performing the charging operation.

4. The imaging apparatus according to claim 1, wherein the control section adjusts a time period from an end of the exposure until a start of the charging operation to be longer in the single shooting mode than in the continuous shooting mode.

5. The imaging apparatus according to claim 4, wherein the control section adjusts a time period from the end of the exposure until a start of reading of the image data to be longer in the time period from the end of the exposure until the start of the charging operation.

6. The imaging apparatus according to claim 4, wherein the control section adjusts a time period from the start of the reading of the image data until the start of the charging operation to be longer in the time period from the end of the exposure until the start of the charging operation.

* * * * *